US007016308B1

(12) United States Patent
Gallagher (10) Patent No.: US 7,016,308 B1
(45) Date of Patent: Mar. 21, 2006

(54) DIGITAL RETURN PATH FOR HYBRID FIBER/COAX NETWORK (75) Inventor: Robert T. Gallagher, Alpharetta, GA (US)

(73) Assignee: Broadband Royalty Corporation, Wilmington, DE (US)

( * ) Notice: Subject to any disclaimer, the term of this patent is extended or adjusted under 35 U.S.C. 154(b) by 0 days.

(21) Appl. No.: 09/273,197

(22) Filed: Mar. 19, 1999

(51) Int. Cl.
H04J 1/16 (2006.01)

(52) U.S. Cl. .................... 370/241; 370/466
(58) Field of Classification Search ............ 370/465, 370/541, 263, 395, 410, 242–244, 248, 250; 359/180, 158, 140, 135
See application file for complete search history.

(56) References Cited

U.S. PATENT DOCUMENTS

| 3,931,473 | A | * | 1/1976 | Ferris, Jr. .................. 370/541 |
| 3,995,144 | A | * | 11/1976 | Johnson et al. ............ 235/402 |
| 4,101,834 | A | | 7/1978 | Stutt et al. |
| 4,112,488 | A | * | 9/1978 | Smith, III .................. 709/222 |
| 4,244,046 | A | * | 1/1981 | Brouard et al. ............ 370/263 |
| 4,354,167 | A | | 10/1982 | Terreault et al. |
| 4,402,076 | A | * | 8/1983 | Krajewski .................. 370/295 |
| 4,531,239 | A | | 7/1985 | Usui |
| 4,701,909 | A | | 10/1987 | Kavehrad et al. |
| 4,754,451 | A | | 6/1988 | Eng et al. |
| 4,816,825 | A | | 3/1989 | Chan et al. |
| 4,920,533 | A | | 4/1990 | Dufresne et al. |
| 4,959,829 | A | | 9/1990 | Griesing |
| 5,136,410 | A | * | 8/1992 | Heiling et al. .............. 359/110 |
| 5,138,440 | A | * | 8/1992 | Radice ........................ 348/472 |
| 5,198,989 | A | * | 3/1993 | Petroff ........................ 702/48 |
| 5,272,700 | A | | 12/1993 | Hansen et al. |
| 5,341,216 | A | * | 8/1994 | Hoffart ........................ 725/13 |
| 5,442,700 | A | | 8/1995 | Snell et al. |
| 5,469,495 | A | * | 11/1995 | Beveridge ................. 348/14.01 |
| 5,469,545 | A | | 11/1995 | Vanbuskirk et al. |
| 5,557,319 | A | | 9/1996 | Gurusami et al. ............. 348/11 |
| 5,587,734 | A | | 12/1996 | Lauder et al. |
| 5,621,786 | A | | 4/1997 | Fischer et al. |
| 5,630,204 | A | | 5/1997 | Hylton et al. |
| 5,631,757 | A | * | 5/1997 | Bodeep et al. .............. 359/113 |

(Continued)

FOREIGN PATENT DOCUMENTS

EP 0 664 621 7/1994

(Continued)

OTHER PUBLICATIONS

Akos et al., Jul. 1999, *IEEE Transactions on Communications*, 47:983-988, "Direct Bandpass Sampling of Multiple Distinct RF Signals".

(Continued)

Primary Examiner—Huy D. Vu
Assistant Examiner—Daniel Ryman
(74) Attorney, Agent, or Firm—Oblon, Spivak, McClelland, Maier & Neustadt, P.C.

(57) ABSTRACT

A hybrid fiber/coax network is provided. The network includes a head end with at least one optical distribution node coupled to the head end over at least one fiber optic link. A plurality of coaxial cable links are coupled to each of the at least one optical distribution node. Further, a transmitter is disposed at the optical distribution node. The transmitter is responsive to signals from the plurality of coaxial cable links. The transmitter converts analog signals to baseband digital signals and transmits the baseband digital signals to the head end over the at least one optical link. A receiver is disposed at the head end. The receiver is responsive to the digital signals from the transmitter and converts the digital signals to analog signals for the head end.

37 Claims, 5 Drawing Sheets

U.S. PATENT DOCUMENTS

| | | | |
|---|---|---|---|
| 5,680,130 A * | 10/1997 | Tsutsui et al. ............... | 341/50 |
| 5,729,370 A * | 3/1998 | Bernstein et al. ........... | 359/118 |
| 5,754,552 A | 5/1998 | Allmond et al. | |
| 5,765,097 A * | 6/1998 | Dail ........................... | 725/125 |
| 5,765,099 A | 6/1998 | Georges et al. | |
| 5,768,682 A | 6/1998 | Peyrovian | |
| 5,774,789 A | 6/1998 | Van der Kaay et al. | |
| 5,777,544 A * | 7/1998 | Vander Mey et al. ... | 340/310.01 |
| 5,828,677 A * | 10/1998 | Sayeed et al. .............. | 714/774 |
| 5,838,989 A | 11/1998 | Hutchison et al. | |
| 5,859,895 A | 1/1999 | Pomp et al. | |
| 5,864,672 A * | 1/1999 | Bodeep et al. ............. | 725/126 |
| 5,864,748 A | 1/1999 | Dail | |
| 5,867,485 A * | 2/1999 | Chambers et al. .......... | 370/281 |
| 5,872,810 A * | 2/1999 | Philips et al. ............... | 375/130 |
| 5,878,325 A * | 3/1999 | Dail ........................... | 725/125 |
| 5,930,262 A | 7/1999 | Sierens et al. | |
| 5,946,622 A | 8/1999 | Bojeryd | |
| 5,963,844 A | 10/1999 | Dail ........................... | 455/5.1 |
| 5,986,691 A | 11/1999 | Henderson | |
| 6,112,086 A * | 8/2000 | Wala .......................... | 370/328 |
| 6,134,035 A * | 10/2000 | Krimmel ...................... | 398/1 |
| 6,144,665 A * | 11/2000 | Karasawa ................ | 370/395.1 |
| 6,148,006 A | 11/2000 | Dyke et al. | |
| 6,282,683 B1 | 8/2001 | Dapper et al. | |
| 6,356,369 B1 * | 3/2002 | Farhan ....................... | 359/115 |
| 6,373,611 B1 * | 4/2002 | Farhan et al. ............... | 398/182 |

FOREIGN PATENT DOCUMENTS

| | | |
|---|---|---|
| EP | 0727883 A2 | 8/1996 |
| WO | WO 96/24989 | 8/1996 |

OTHER PUBLICATIONS

Nakatsugawa et al., 2000, *IEEE*, pp. 617-621, "Software Radio Base and Personal Stations for Cellular/PCS Systems".

1998, Foxcom Wireless Proprietary Information, pp. 1-8, "Litenna In-Binding RF Distribution System".

1998, Foxcom Wireless Proprietary Information, pp. 3-11, "Application Note Rfiber-RF Fiberoptic Links for Wireless Applications".

"Broadband Medium Attachment Unit and Broadband Medium Specification, Type 10BROAD36", *ANS/IEEE Std. 802.3*, 177-205, (1996).

Sniezko, O., "Reverse Path for Advanced Series—Architecture and Technology", *NCTA Technical Papers*, AT&T Broadband & Internet Services, 11-19, (1999).

Sniezko, O. et al., "HFC Architecture in the Making", *NCTA Technical Papers*, AT&T Broadband & Internet Services, 20-29, (1999).

Dail et al., "Adaptive Digital Access Protocol: A MAC Protocol for Multiservice Broadband Access Networks," *IEEE Communications Magazine*, 34(3), 104-112 (Mar. 1, 1996).

Cambron, Keith, et al., "California First A full Service Optical Network", Session 9 of the 10th Annual National Fiber Optics engineers Conference, Jun. 12-16, 1994, vol. 2, pp. 289-302.

Chapuran, Thomas E., et al., "Optimization of Fiber/Coax Upgrades for FITL Systems with Analog and Digital Video Transmission", Session 9 of the 10th Annual National Fiber Optics engineers Conference, Jun. 12-16, 1994, vol. 2, pp. 329-340.

Pyle, Ken "Prospects for Migration of Hybrid Fiber/Coax technology to a Fiber to the Home Implementation", Session 9 of the 10th Annual National Fiber Optics engineers Conference, Jun. 12-16, 1994, vol. 2, pp. 319-328.

Wagner, Stuart S., "Technical Modeling and Analysis of Digital Video Transmission Over Fiber/Coax Networks", Session 9 of the 10th Annual National Fiber Optics engineers Conference, Jun. 12-16, 1994, vol. 2, pp. 303-318.

"Scientific-Atlanta Annouces New Technology To Enable High-Capacity Digital Reverse Path For Interactive Services", http://www.sciatl.com, Scientific-Atlanta, Inc., Norcross, GA, 1-2, (Jan. 18, 1999).

"Creating a Network for Interactivity", IEEE Spectrum, IEEE Inc., New York, US, vol. 32, No. 4, Apr. 1995, pp. 58-63, XP000506858, ISSN: 0018-9235.

* cited by examiner

Fig. 5

DIGITAL RETURN PATH FOR HYBRID FIBER/COAX NETWORK

TECHNICAL FIELD OF THE INVENTION

The present invention relates generally to the field of telecommunications and, in particular, to a digital return path for a hybrid fiber/coax network.

BACKGROUND

Cable networks originally carried programming from an head end to subscribers over a network of coaxial cable. Over time, these networks have changed. Some cable networks now include fiber optic links as part of the network. This variety of cable network is colloquially referred to as an "hybrid fiber/coax" network.

An hybrid fiber/coax network typically includes an head end that broadcasts programming over the network to subscribers in a downstream direction. The network includes two main portions. The first portion of the network is optical links that connect the head end with a number of geographically dispersed distribution nodes. These nodes are referred to as "optical distribution nodes" or "ODNs." At the ODNs, signals from the head end that carry the programming are converted from optical signals to electrical signals. The second portion of the network is coaxial links that connect the ODNs with subscriber equipment. The electrical signals are transmitted to the subscriber equipment over the coaxial cable links.

In recent years, the cable industry has experimented with systems that allow for bi-directional communication between subscriber equipment and the head end. This would allow for services such as video-on-demand, telephony and Internet traffic to be offered over a cable network. The upstream communication is typically reserved for transmission in the 5 to 42 MHZ frequency range.

One problem with such as system is the quality of signals that are transmitted over this return path from the subscriber equipment to the head end. The signals are subject to problems such as distortion and noise. Further, it is difficult to measure the effect of these influences on the signals.

For the reasons stated above, and for other reasons stated below which will become apparent to those skilled in the art upon reading and understanding the present specification, there is a need in the art for an improved return path for a hybrid fiber/coax network.

SUMMARY

The above mentioned problems with telecommunications systems and other problems are addressed by the present invention and will be understood by reading and studying the following specification. A hybrid fiber/coax network is described which uses digital, baseband transmission in the reverse link between the optical distribution node and the head end.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

I. Hybrid Fiber/Coax Network with Digital Return Path

Figure 1:
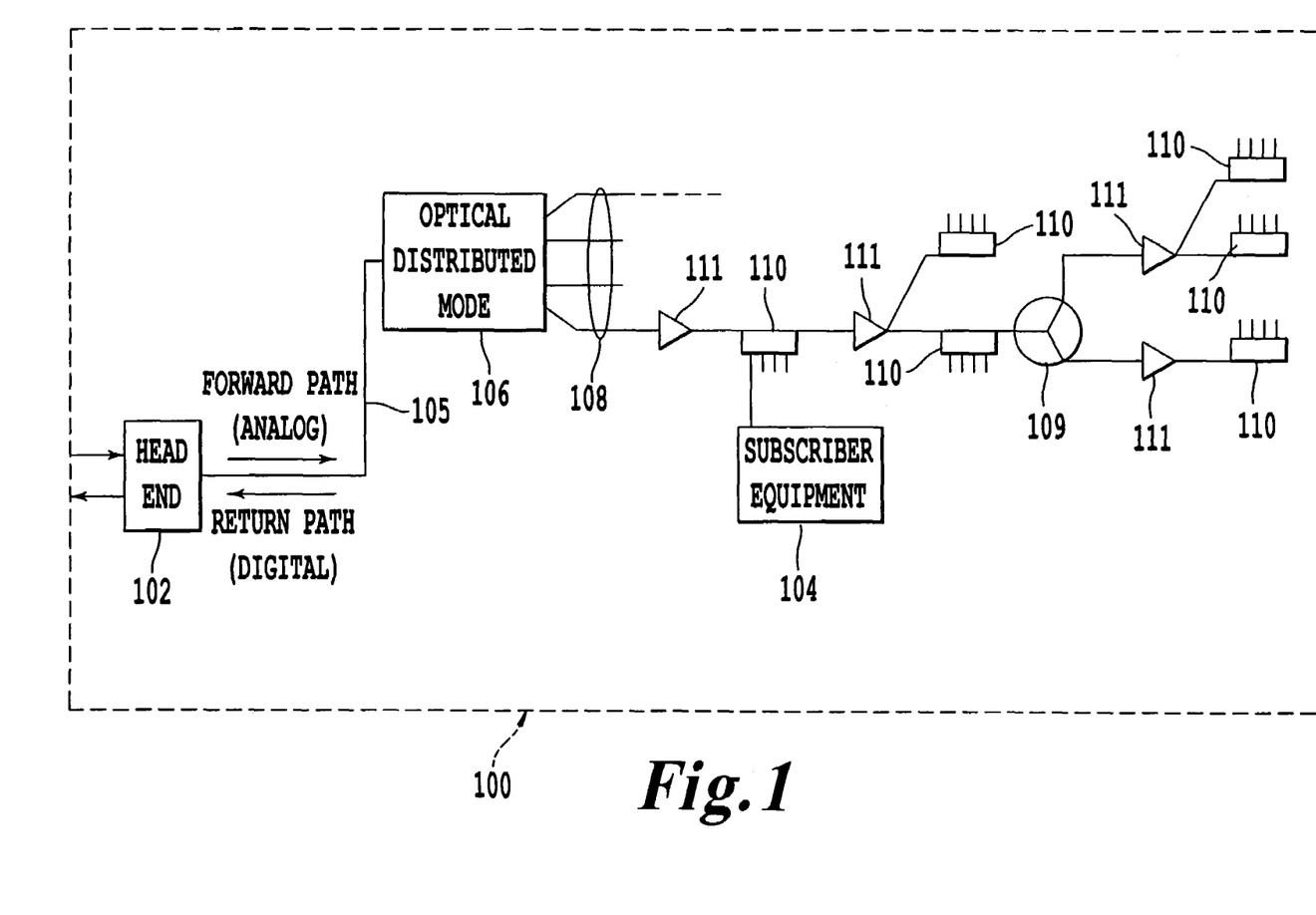
FIG. 1 is a block diagram of an embodiment of a hybrid fiber/coax network constructed according to the teachings of the present invention.

FIG. 1 is a block diagram of an embodiment of a hybrid fiber/coax network, indicated generally at 100, and constructed according to the teachings of the present invention. Network 100 is a bidirectional network that carries signals between head end 102 and a number of users.

For simplicity in describing network 100, the users are represented in FIG. 1 by subscriber equipment 104. It is understood that network 100 can serve any appropriate number of users. Further, network 100 can support a wide variety of subscriber equipment including, but not limited to, audio/video, data, and telephony equipment.

Head end 102 is coupled to subscriber equipment 104 over a combination of fiber optics and coaxial cable. Namely, head end 102 is coupled via fiber optic link 105 with optical distribution node 106. Optical distribution node 106 is also coupled to coaxial cable links or branches 108. Typically, optical distribution node 106 supports up to four coaxial links 108. However, any appropriate number of links can be used to carry signals between optical distribution node 106 and subscriber equipment 104 through the use of multiple output broadband amplifiers 111 or splitters 109. Subscriber equipment, represented by subscriber equipment 104, is selectively coupled to coaxial links 108 via taps 110.

Advantageously, network 100 uses baseband digital transmission to carry upstream signals from optical distribution node 106 to head end 102 optical fiber link 105. Typically, these upstream transmissions are accomplished in the 5 to 42 MHZ band. However, other transmission formats can be used to carry the upstream transmissions in network 100. At optical distribution node 106, the upstream frequency band is converted from an analog signal to a baseband, digital signal by an upstream transmitter. Exemplary embodiments of a transmitter for optical distribution node 106 are shown and described with respect to FIGS. 2 and 4.

Additional data may also be added to the digital signal, e.g., signals that monitor the status of the optical distribution node, the bit error rate link performance monitor. This digital signal is then transmitted over optical link 105 to a receiver at head end 102 that converts the digital signal back to analog form for processing by the head end.

The use of baseband, digital transmission in the upstream over optical link 105 provides several advantages over traditional analog transmission. For example, the performance of the return path over link 105 can be monitored in real time. This provides, among other advantages, the opportunity for real-time analysis of data integrity, e.g., monitoring bit error rate link performance monitoring. Further, the field set-up of the optical distribution node is simplified over conventional approaches since issues related to, for example, complex balancing of tilt, level and average power in analog equipment to achieve optimum analog laser performance have been removed.

II. Transmitter for Digital Return Path

Figure 2:
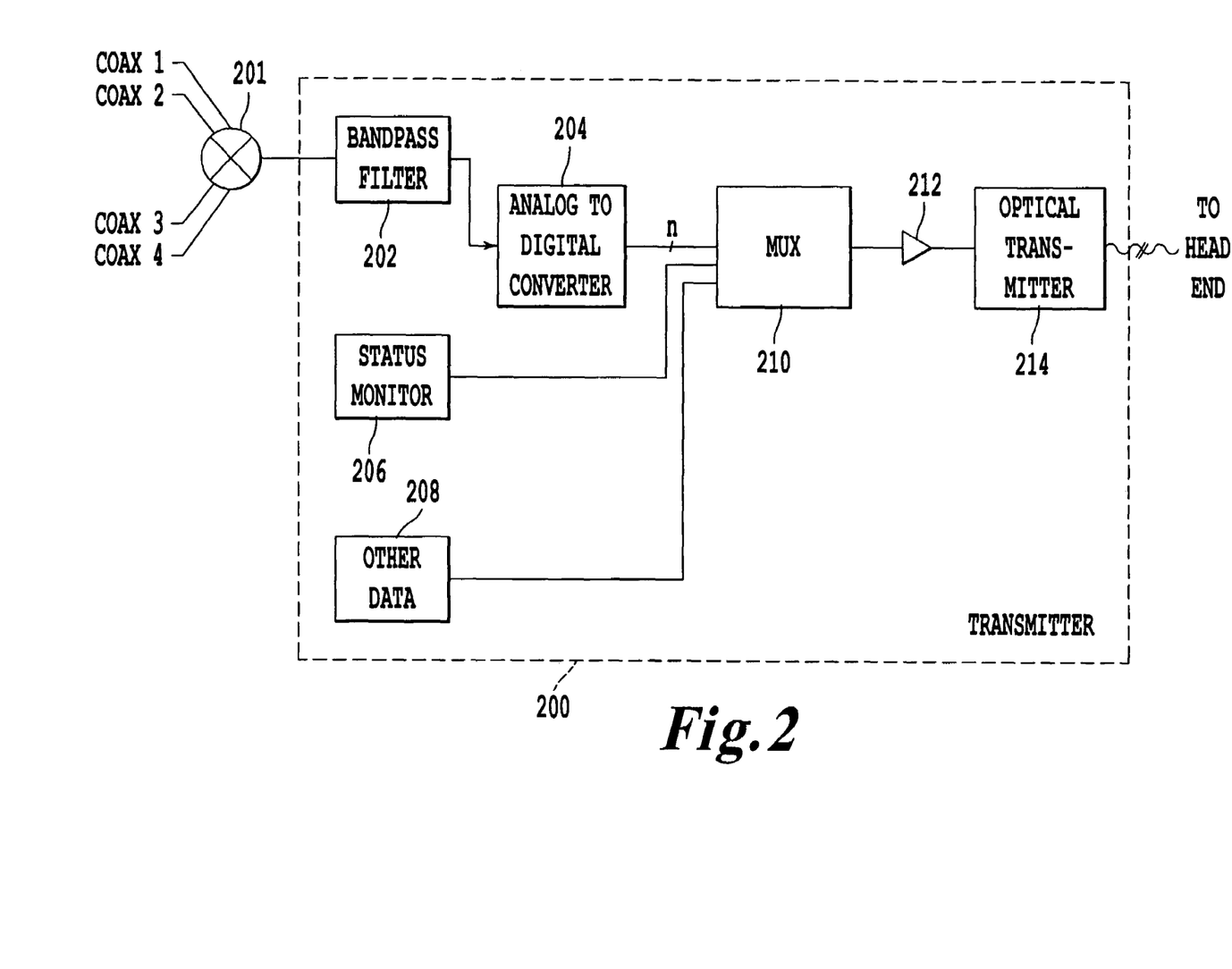
FIG. 2 is a block diagram of one embodiment of a transmitter in an optical distribution node for a return path of a hybrid fiber/coax network according to the teachings of the present invention.

FIG. 2 is a block diagram of an embodiment of a transmitter, indicated generally at 200, in an optical distribution node for a return path of a hybrid fiber/coax network according to the teachings of the present invention. Transmitter 200 includes bandpass filter 202 coupled to receive input from 1 to 4 coaxial links. Typically, signals from four coaxial links are coupled to bandpass filter 202 through 4 to 1 combiner 201. Each coaxial input to combiner 201 shares the same frequency spectrum. In one embodiment, bandpass filter 202 selectively passes signals in the 5 to 42 MHZ frequency range. The analog signals from bandpass filter 202 are provided to analog to digital converter (ADC) 204 to convert the signals to baseband digital signals. The output of ADC 204 is an n bit wide signal, e.g., 10 bits. ADC 204 samples the analog signal from the coaxial links and produces 850 to 1000 Mega-bits per second with a 10 bit wide ADC 204. An analog to digital converter that operates at this rate is AD9070, commercially available from Analog Devices, of Norwood, Mass. The digital output of ADC 204 is converted to a serial data stream by multiplexer (MUX) 210.

MUX 210 also can add other data to the serial data stream. For example, status information from status monitor 206 can be added. Status monitor 206 provides information on the operation of the optical distribution node to the head end of the hybrid fiber/coax network. Further, other data 208 can also be provided. This data includes framing data and data for bit error rate link performance testing.

MUX 204 is coupled to optical transmitter 214 through laser drive amplifier 212. Optical transmitter comprises, for example, a 1310 nanometer, digital laser that transmits data with a bit rate of up to approximately 1 Gigabits per second. This bit rate is approximately a SONET OC-24 bit rate. A digital laser that operates in this manner is part no. 1241FCDC, commercially available from Lucent Technology of Murray Hill, N.J. Other digital lasers can also be used that operate at different wavelengths, e.g., 1550 nanometers, and with different data rates.

Optical transmitter 214 provides this optical signal to a head end over an optical fiber.

III. Receiver for Digital Return Path

Figure 3:
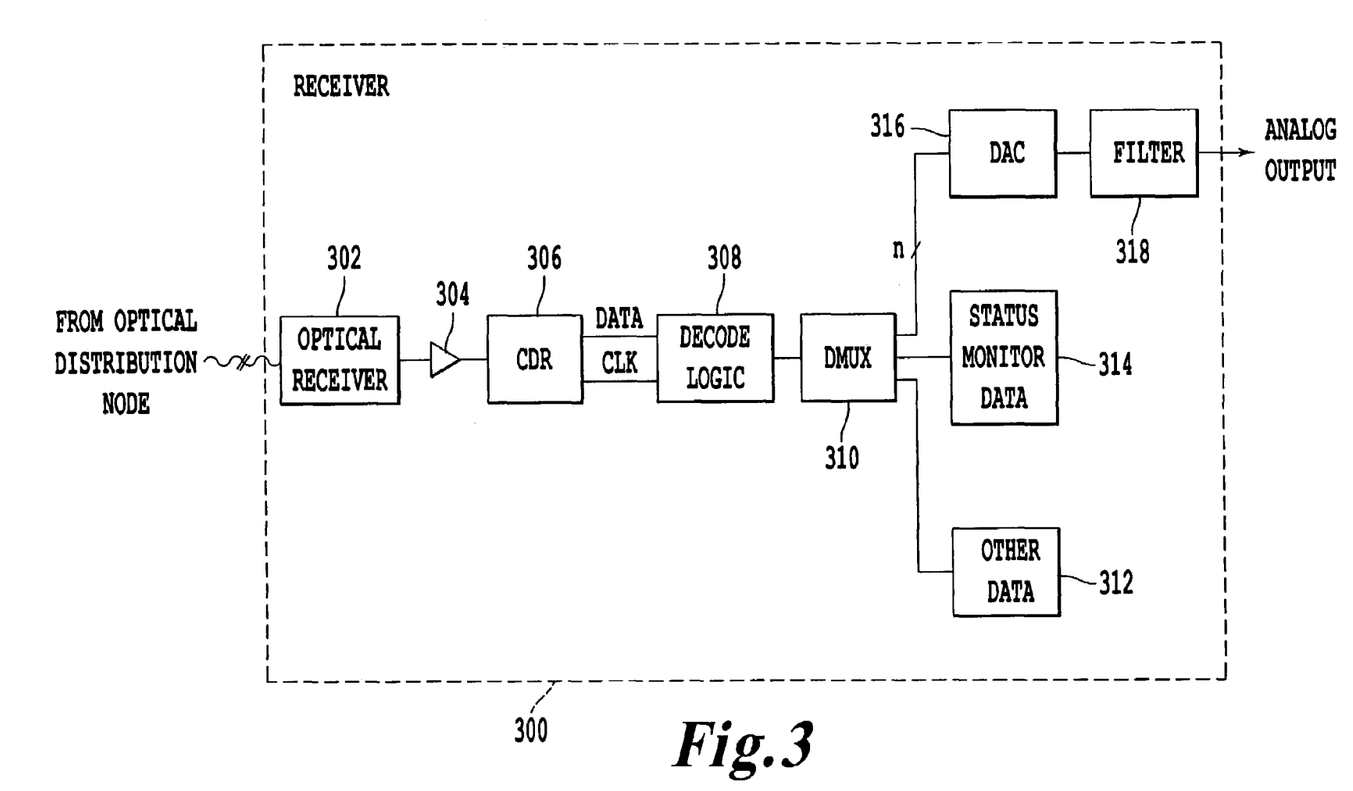
FIG. 3 is a block diagram of one embodiment of a receiver in a head end for a return path of a hybrid fiber/coax network according to the teachings of the present invention.

FIG. 3 is a block diagram of one embodiment of a receiver, indicated generally at 300, in a head end for a baseband, digital return path of a hybrid fiber/coax network according to the teachings of the present invention. Receiver 300 includes an optical receiver, e.g., avalanche photo diode, that is coupled to receive optical signals over an optical fiber from an optical distribution node. An acceptable optical receiver is the 1319P that is commercially available from Lucent Technology, of Murray Hill, N.J.

Optical receiver 302 is coupled to clock data recovery device (CDR) 306 through transimpedence amplifier 304. In one embodiment, CDR 306 is based on a SONET OC-24 type of clock data recovery device commercially available from Lucent Technologies of Murray Hill, N.J. CDR 306 recovers the clock signal (CLK) used in transmitting the optical signals over the optical fiber. Further CDR 306 separates out the data from the received digital signal. CDR 306 maintains the data synchronous with the clock signal.

CDR 306 is coupled to provide the data and the CLK signal to decode logic 308. Decode logic 308 is coupled to demultiplexer (DMUX) 310. Decode logic 308 aligns the start of data information to DMUX 310 with respect to the framing start that is generated by other data block 208 of FIG. 2. All data is position encoded with a frame. Decode logic 308 detects frame start and position by bit.

DMUX 310 separates data from the digital signal that was added to the digital data stream at the optical distribution node. For example, DMUX 310 separates out data from a status monitor and provides this information to block 314. This information can be used by the head end to control the operation, or monitor the operation of the optical distribution node. Further, DMUX 310 provides other data 208 that was added to the digital signal to other data block 312. This other data may include, for example, data for determining a bit error rate link performance or other appropriate data. Finally, DMUX 310 provides an n-bit signal to digital to analog converter (DAC) 316. This signal corresponds to the digitization of the upstream signal received by the optical distribution node. DAC 316 converts this signal to an analog signal. An appropriate DAC for this function is the AD9731 commercially available from Analog Devices, of Norwood, Mass.

DAC 316 is coupled to filter 318. Filter 318 compensates for the effect of quantization in the analog to digital conversion at the optical distribution node by use of a $(\sin x)/x$ function. The output of filter 318 is analog data that is provided to the head end for processing, e.g., the output of filter 318 is an analog signal in the 5 to 42 MHZ frequency range.

IV. Alternative Embodiment for Transmitter for Digital Return Path

Figure 4:
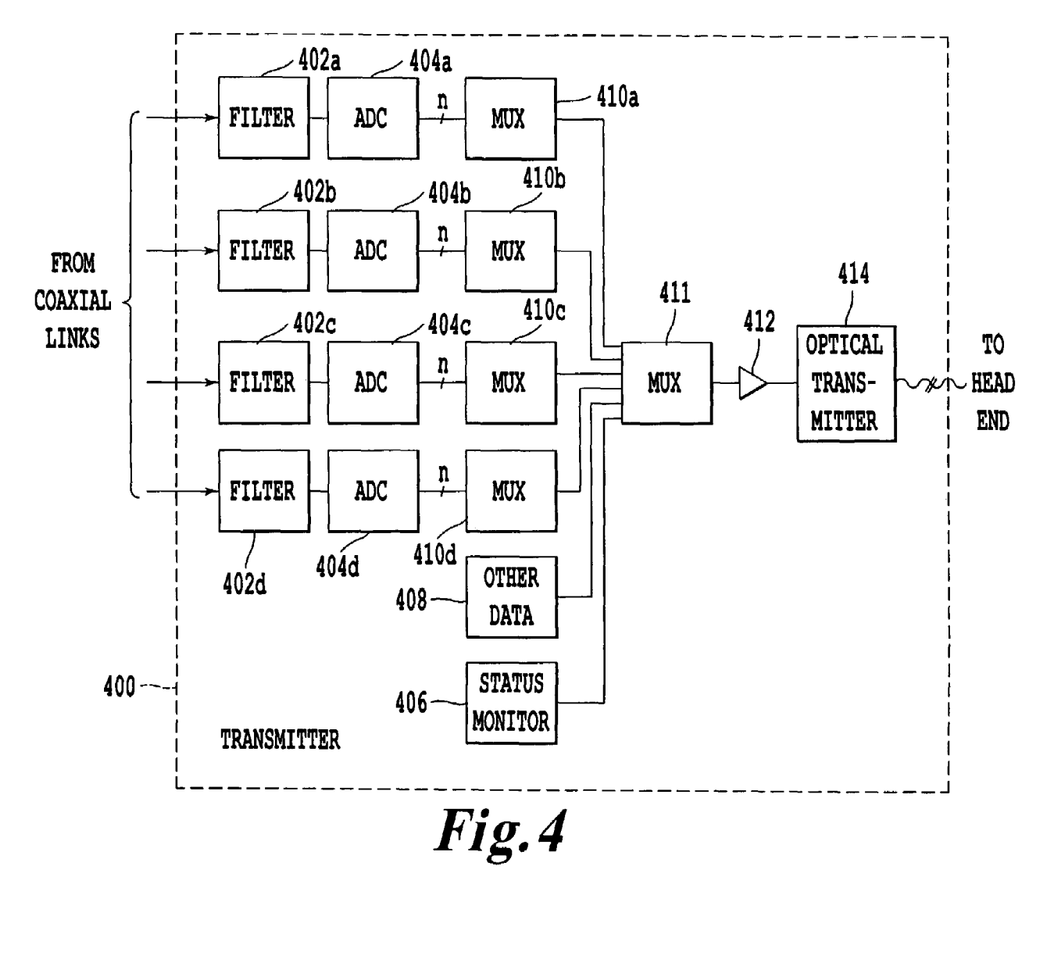
FIG. 4 is a block diagram of another embodiment of a transmitter in an optical distribution node for a return path of a hybrid fiber/coax network according to the teachings of the present invention.

FIG. 4 is a block diagram of another embodiment of a transmitter, indicated generally at 400, in an optical distribution node for a return path of a hybrid fiber/coax network according to the teachings of the present invention. Transmitter 400 includes bandpass filters 402*a*, 402*b*, 402*c*, and 402*d*. to receive input from four separate coaxial links. Bandpass filters 402*a*, 402*b*, 402*c*, and 402*d* pass signals in the 5 to 42 MHZ frequency range. Other frequency ranges can be used for the upstream communications.

This embodiment implements a digital form of "block conversion" such that each coaxial link can use the full 5 to 42 MHZ frequency spectrum. Conventionally, upstream transmission in a hybrid fiber/coax system is limited by the fact that each of the coaxial links coupled to a common optical distribution node uses the same frequency spectrum to carry signals from users to the head end. Thus, the coaxial links cannot make full use of the upstream spectrum without potentially interfering with each other when combined at the optical distribution node. Block conversion has been used in some systems so that the upstream communications on the coaxial legs are frequency shifted at the optical distribution node such that each coaxial link can use the full 5 to 42 MHZ frequency spectrum. This is referred to as "block conversion."

In this embodiment, the effect of block conversion is achieved with digital signals; namely, each coaxial leg can use the full upstream spectrum, e.g., 5 to 42 MHZ. When signals from the multiple coaxial links are combined at the optical distribution node. The signal from each coaxial link is separately filtered and converted to digital format. Then, the separate digital signals are combined into a higher bit rate digital signal for transmission to the head end. Thus, this embodiment accomplishes the advantages of block conversion in the digital domain.

The analog signals from bandpass filters 402a, 402b, 402c, and 402d are provided to analog to digital converters (ADCs) 404a, 404b, 404c, and 404d, respectively. ADCs 404a, 404b, 404c, and 404d convert the signals from bandpass filters 402a, 402b, 402c, and 402d, respectfully, to baseband digital signals. ADCs 404a, 404b, 404c, and 404d each provide an "n" bit wide signal, e.g., 10 bits as a digital output. ADCs 404a, 404b, 404c, and 404d each sample their respective analog signals from the bandpass filters 402a, 402b, 402c, and 402d and produce 850 to 1000 Megabits per second with 10 bit wide ADCs 404a, 404b, 404c, and 404d. An analog to digital converter that operates at this rate is AD9070, commercially available from Analog Devices, of Norwood, Mass. The digital output of ADCs 404a, 404b, 404c, and 404d are each converted to a serial data stream by multiplexers (MUXs) 410a, 410b, 410c, and 410d, respectively.

MUXs 410a, 410b, 410c, and 410d are coupled to multiplexer 411 to create a digital data stream for transmission to the head end. Additional information also can be added to the serial data stream output by multiplexer 411. For example, status information from status monitor 406 can be added. Status monitor 406 provides information on the operation of the optical distribution node to the head end of the hybrid fiber/coax network. Further, other data 408 can also be provided. This data includes, for example, framing data and data for bit error rate link performance testing.

MUX 411 is coupled to optical transmitter 414 through laser drive amplifier 412. Optical transmitter 412 comprises, for example, a 1310 nanometer, digital laser that transmits data with a bit rate of up to approximately 5 Gigabits per second. This bit rate is approximately a SONET OC-96 bit rate. A digital laser that operates in this manner is E2560, commercially available from Lucent Technologies of Murray Hill, N.J. Other digital lasers can also be used that operate at different wavelengths, e.g., 1550 nanometers, and with different data rates.

Optical transmitter 414 provides this signal to a head end over an optical fiber.

V. Alternative Embodiment for Receiver for Digital Return Path

Figure 5:
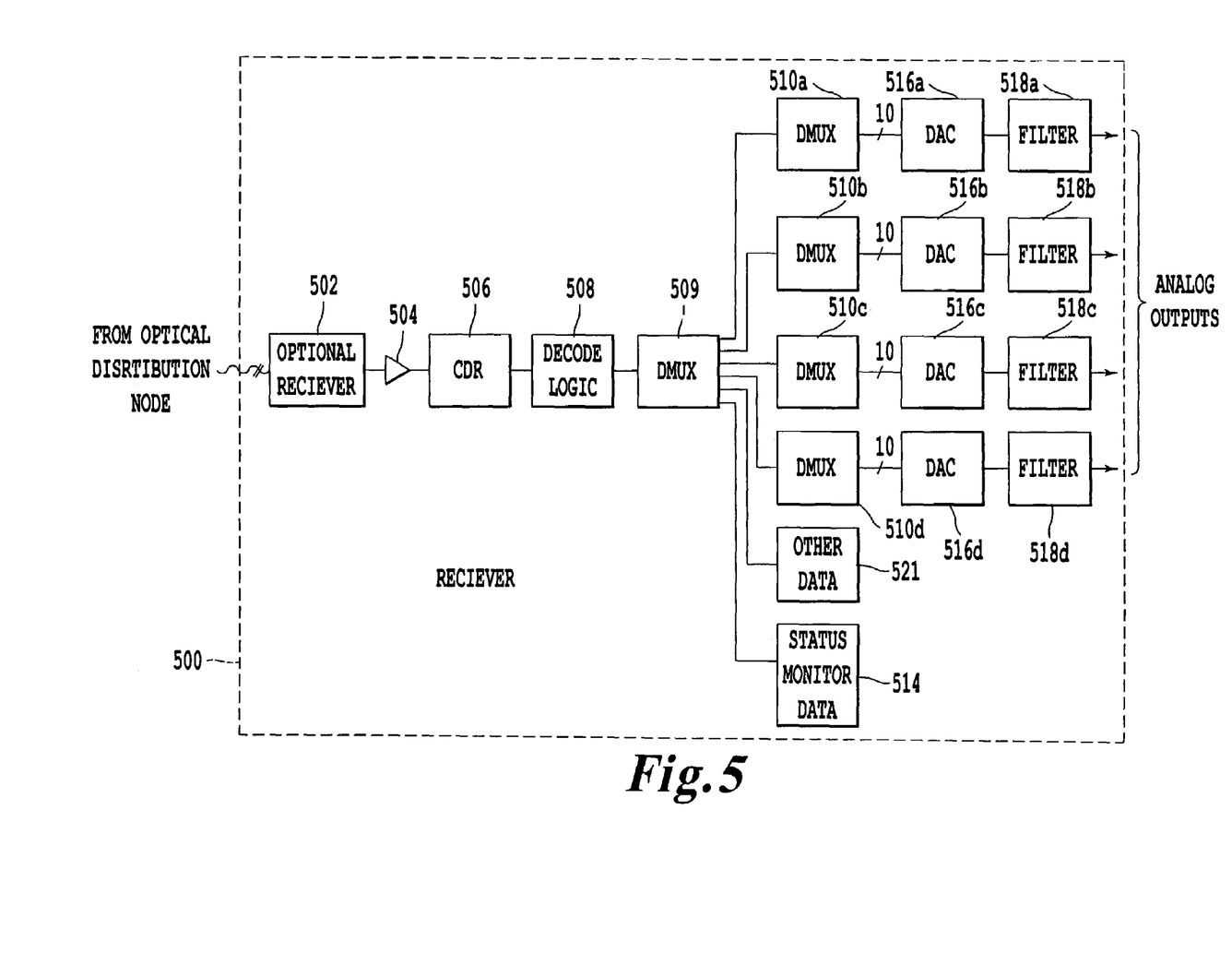
FIG. 5 is a block diagram of another embodiment of a receiver in a head end for a return path of a hybrid fiber/coax network according to the teachings of the present invention.

FIG. 5 is a block diagram of another embodiment of a receiver, indicated generally at 500, in a head end for a baseband digital return path of a hybrid fiber/coax network according to the teachings of the present invention. Receiver 500 includes an optical receiver, e.g., avalanche photo diode, that is coupled to receive optical signals over an optical fiber from an optical distribution node. An acceptable optical receiver is the 1319TP that is commercially available from Lucent Technology, of Murray Hill, N.J. Receiver 500 works with signals that implement a digital form of block conversion such as described above with respect to FIG. 4.

Optical receiver 502 is coupled to clock data recovery device (CDR) 506 through transimpedence amplifier 504. In one embodiment, CDR 506 is based on a SONET OC-96 type of clock data recovery device commercially available from Lucent Technologies of Murray Hill, N.J. CDR 506 recovers the clock signal (CLK) used in transmitting the optical signals over the optical fiber. Further CDR 506 separates out the data from the received digital signal. CDR 506 maintains the data synchronous with the clock signal.

CDR 506 is coupled to provide the data and the CLK signal to decode logic 508. Decode logic 508 is coupled to demultiplexer (DMUX) 509. Decode logic 508 aligns the start of data information to DMUX 509 with respect to the framing start that is generated by other data block 408 of FIG. 4. All data is position encoded with a frame. Decode logic 508 detects frame start and position by bit.

DMUX 509 separates data from the digital signal that was added to the digital data stream at the optical distribution node. For example, DMUX 509 separates out data from a status monitor and provides this information to block 514. This information can be used by the head end to control the operation, or monitor the operation of the optical distribution node. Further, DMUX 408 provides other data that was added to the digital signal to other data block 512. This other data may include, for example, data for determining a bit error rate link performance or other appropriate data. Finally, DMUX 509 separates the remaining data into a number of channels corresponding to the coaxial links that provided the data to the optical distribution node. This data is provided to demultiplexers (DMUXs) 510a, 510b, 510c, and 510d. DMUXs 510a, 510b, 510c, and 510d each provide an n-bit wide signal, e.g., 10 bits, to digital to analog converters (DACs) 516a, 516b, 516c, and 516d, respectively. These signals correspond to the digitization of the upstream signal received by the optical distribution node from each of the coaxial links. DACs 516a, 516b, 516c, and 516d each convert their respective signals to an analog signals. An appropriate DAC for this function is the AD 9731 commercially available from Analog Devices, of Norwood, Mass.

DACs 516a, 516b, 516c, and 516d are coupled to filters 518a, 518b, 518c, and 518d, respectively. Filters 518a, 518b, 518c, and 518d compensate for the effect of quantization in the analog to digital conversion at the optical distribution node by use of a (sin x)/x function. The output of filters 518a, 518b, 518c, and 518d are analog data streams that are provided to the head end for processing, e.g., the output of filters 518a, 518b, 518c, and 518d are analog signals in the 5 to 42 MHZ frequency range.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the upstream signals can be transmitted in a different frequency spectrum. Further, other wavelengths can be used to transmit the digital signals over the optical link between the optical distribution node and the head end. The optical distribution nodes can also be coupled to any appropriate number of coaxial links.

What is claimed is:

1. A hybrid fiber/coax network comprising:
an optical distribution node including a transmitter the transmitter including,
an analog-to-digital converter configured to convert a first analog signal into a baseband digital signal,
a status monitoring unit configured to generate status data representing an operational status of the optical distribution node,
a multiplexer configured to convert the baseband digital signal into a serial data stream, and configured to multiplex the serial data stream and the status data to create a combined digital signal, and
an optical transmitter configured to transmit the combined digital signal via a fiber optic link; and
a head end configured to be coupled to the optical distribution node via the fiber optic link, configured to control or monitor an operation of the optical distribution node based on the status data, and including a receiver, the receiver including,
an optical receiver configured to receive the combined digital signal via the fiber optic link,
a demultiplexer configured to demultiplex the combined digital signal into the baseband digital signal and the status data, and
a node status monitoring unit configured to receive the status data from the demultiplexer, and
a digital-to-analog converter configured to convert the baseband digital signal into a second analog signal, the second analog signal being a reconstructed signal corresponding to the first analog signal.

2. The hybrid fiber/coax network of claim 1, wherein the multiplexer is further configured to multiplex framing data to create the combined digital signal.

3. The hybrid fiber/coax network of claim 2, wherein the demultiplexer is further configured to demultiplex the combined digital signal into framing data.

4. The hybrid fiber/coax network of claim 1, wherein the analog-to-digital converter is configured convert the first analog signal to the baseband digital signal at least at 850 mega-bits second with a 10-bit data width.

5. The hybrid fiber/coax network of claim 1, wherein the optical transmitter is configured to transmit the combined digital signal at a bit rate of up to approximately 1 gigabit per second.

6. The hybrid fiber/coax network of claim 1, wherein the multiplexer is further configured to multiplex data for bit error rate link performance testing to create the combined digital signal.

7. The hybrid fiber/coax network of claim 1, wherein the receiver further includes:
a clock data recovery device configured to receive the combined digital signal from the optical receiver; and
a decode logic unit configured to receive the combined digital signal and a clock signal from the clock data recovery device.

8. A hybrid fiber/coax network comprising:
an optical distribution node configured to be coupled to a plurality of coaxial cable links of a predetermined quantity and including a transmitter, the transmitter including,
a plurality of analog-to-digital converters of the predetermined quantity, each configured to convert a corresponding first analog signal into a corresponding baseband digital signal,
a plurality of first multiplexers of the predetermined quantity, each configured to convert the corresponding baseband digital signal into a serial data stream,
a status monitoring unit configured to generate status data representing an operational status of the optical distribution node,
a second multiplexer configured to multiplex the serial data stream received from the plurality of first multiplexers and the status data to create a combined digital signal, and
an optical transmitter configured to transmit the combined digital signal via a fiber optic link; and
a head end configured to be coupled to the optical distribution node via the fiber optic link, configured to control or monitor an operation of the optical distribution node based on the status data, and including a receiver, the receiver including,
an optical receiver configured to receive the combined digital signal via the fiber optic link,
a first demultiplexer configured to demultiplex the combined digital signal into the baseband digital signals and the status data,
a plurality of second demultiplexers of the predetermined quantity, each configured to convert a corresponding one of the baseband digital signals received from the first demultiplexer into a non-serial data stream format,
a plurality of digital-to-analog converters of the predetermined quantity, each configured to convert the corresponding baseband digital signals into a corresponding second analog signal, each of the second analog signals being a reconstructed signal corresponding to a respective one of the first analog signals, and
a node status monitoring unit configured to receive the status data from the first demultiplexer.

9. The hybrid fiber/coax network of claim 8, wherein the second multiplexer is further configured to multiplex framing data to create the combined digital signal.

10. The hybrid fiber/coax network of claim 9, wherein the first demultiplexer is further configured to demultiplex the combined digital signal into framing data.

11. The hybrid fiber/coax network of claim 8, wherein the second multiplexer is further configured to multiplex data for bit error rate link performance testing to create the combined digital signal.

12. The hybrid fiber/coax network of claim 8, wherein the receiver further includes:
a clock data recovery device configured to receive the combined digital signal from the optical receiver; and
a decode logic unit configured to receive the combined digital signal and a clock signal from the clock data recovery device.

13. The hybrid fiber/coax network of claim 8, wherein the optical transmitter is configured to transmit the combined digital signal at a bit rate of up to approximately 5 gigabits per second.

14. A method for handling data in a return path of a hybrid fiber coax network, comprising:
processing an analog signal, by an optical distribution node, including,
receiving a first analog signal from at least one of a plurality of coaxial cable links,
converting the first analog signal into a baseband digital signal;

generating status data representing an operational status of the optical distribution node of the hybrid fiber coax network, converting the baseband digital signal into a serial data stream, multiplexing the serial data stream and the status data to create a combined digital signal, and transmitting the combined digital signal via a fiber optic link from the optical distribution node; and processing the combined digital signal, by a head end, including, receiving the combined digital signal via the fiber optic link at the head end of the hybrid fiber coax network;

demultiplexing the combined digital signal into the baseband digital signal and the status data, storing the status data in a node status monitoring unit of the head end, and converting the baseband digital signal into a second analog signal, the second analog signal being a reconstructed signal corresponding to the first analog signal, and controlling or monitoring an operation of the optical distribution node based on the status data.

15. The method of claim 14, wherein the multiplexing further includes multiplexing framing data to create the combined digital signal.

16. The method of claim 15, wherein the demultiplexing further includes demultiplexing the combined digital signal into framing data.

17. The method of claim 14, wherein the transmitting further includes transmitting the combined optical signal via the fiber optic link at a bit rate of up to approximately 5 gigabits per second.

18. The method of claim 14, wherein the multiplexing further includes multiplexing data for bit error rate link performance testing to create the combined digital signal.

19. The method of claim 14, further comprising:

inputting the combined digital signal to a clock data recovery device; and transmitting the combined digital signal and a clock signal from the clock data recovery device to a decode logic unit.

20. An optical distribution node configured for use in a hybrid fiber/coax network, the optical distribution node comprising:

a coaxial input configured to input an analog signal from at least one of a plurality of coaxial cable links;

an analog-to-digital converter configured to convert the analog signal into a baseband digital signal;

a status monitoring unit configured to generate status data representing an operational status of the optical distribution node;

a multiplexer configured to convert the baseband digital signal into a serial data stream, and configured to multiplex the serial data stream and the status data to create a combined digital signal; and an optical transmitter configured to transmit the combined digital signal to a head end via a fiber optic link, wherein the optical distribution node is configured to have an operation controlled or monitored by the head end based on the status data.

21. The optical distribution node of claim 20, wherein the multiplexer is further configured to multiplex framing data to create the combined digital signal.

22. The optical distribution node of claim 20, wherein the optical transmitter is configured to transmit the combined digital signal at a bit rate of up to approximately 1 gigabit per second.

23. The optical distribution node of claim 20, wherein the multiplexer is further configured to multiplex data for bit error rate link performance testing to create the combined digital signal.

24. A head end configured for use in a hybrid fiber/coax network, the head end comprising:

an optical receiver configured to receive a combined digital signal from an optical distribution node via a fiber optic link, the combined digital signal including status data representing an operational status of the optical distribution node and a baseband digital signal constructed from a first analog signal input to the optical distribution node;

a demultiplexer configured to demultiplex the combined digital signal into the baseband digital signal and the status data;

a node status monitoring unit configured to receive the status data from the demultiplexer; and a digital-to-analog converter configured to convert the baseband digital signal into a second analog signal, the second analog signal being a reconstructed signal corresponding to the first analog signal, wherein the head end is configured to control or monitor an operation of the optical distribution node based on the status data.

25. The head end of claim 24, wherein the demultiplexer is further configured to demultiplex the combined digital signal into framing data.

26. The head end of claim 24, wherein the optical receiver is configured to receive the combined digital signal at a bit rate of up to approximately 1 gigabit per second.

27. The head end of claim 24, wherein the demultiplexer is further configured to demultiplex the combined digital signal into data for bit error rate link performance testing.

28. The head end of claim 24, further comprising:

a clock data recovery device configured to receive the combined digital signal from the optical receiver; and a decode logic unit configured to receive the combined digital signal and a clock signal from the clock data recovery device.

29. A method of operating an optical distribution node configured for use in a hybrid fiber/coax network, the method comprising:

receiving analog signals from at least one of a plurality of coaxial cable links;

converting the analog signals into baseband digital signals;

generating status data representing an operational status of the optical distribution node;

converting the baseband digital signals into a serial data streams;

multiplexing the serial data streams and the status data to create a combined digital signal;

transmitting the combined digital signal to a head end via a fiber optic link; and controlling or monitoring an operation of the optical distribution node based on the status data, wherein the receiving, converting the analog signals, generating, converting the baseband digital signals, multiplexing, and transmitting are performed by the optical distribution node, and the controlling or monitoring is performed by the head end.

30. The method of claim 29, wherein the multiplexing further includes multiplexing framing data to create the combined digital signal.

31. The method of claim 29, wherein the transmitting further includes transmitting the combined digital signal at a bit rate of up to approximately 5 gigabits per second.

32. The method of claim 29, wherein the multiplexing further includes multiplexing data for bit error rate link performance testing to create the combined digital signal.

33. A method of operating a head end configured for use in a hybrid fiber/coax network, the method comprising:

receiving a combined digital signal from an optical distribution node via a fiber optic link, the combined digital signal including status data representing an operational status of the optical distribution node and a baseband digital signal constructed from a first analog signal input to the optical distribution node;

demultiplexing the combined digital signal into the baseband digital signal and the status data;

converting the baseband digital signal into a second analog signal, the second analog signal being a reconstructed signal corresponding to the first analog signal; and controlling or monitoring an operation of the optical distribution node based on the status data, wherein the receiving, demultiplexing, converting, and controlling or monitoring are performed by the head end.

34. The method of claim 33, wherein the demultiplexing further includes demultiplexing the combined digital signal into framing data.

35. The method of claim 33, wherein the receiving further includes receiving the combined digital signal at a bit rate of up to approximately 5 gigabits per second.

36. The method of claim 33, wherein the demultiplexing further includes demultiplexing the combined digital signal into data for bit error rate link performance testing.

37. The method of claim 33, further comprising:

inputting the combined digital signal to a clock data recovery device; and transmitting the combined digital signal and a clock signal from the clock data recovery device to a decode logic unit.

* * * * *